Patented Oct. 23, 1945

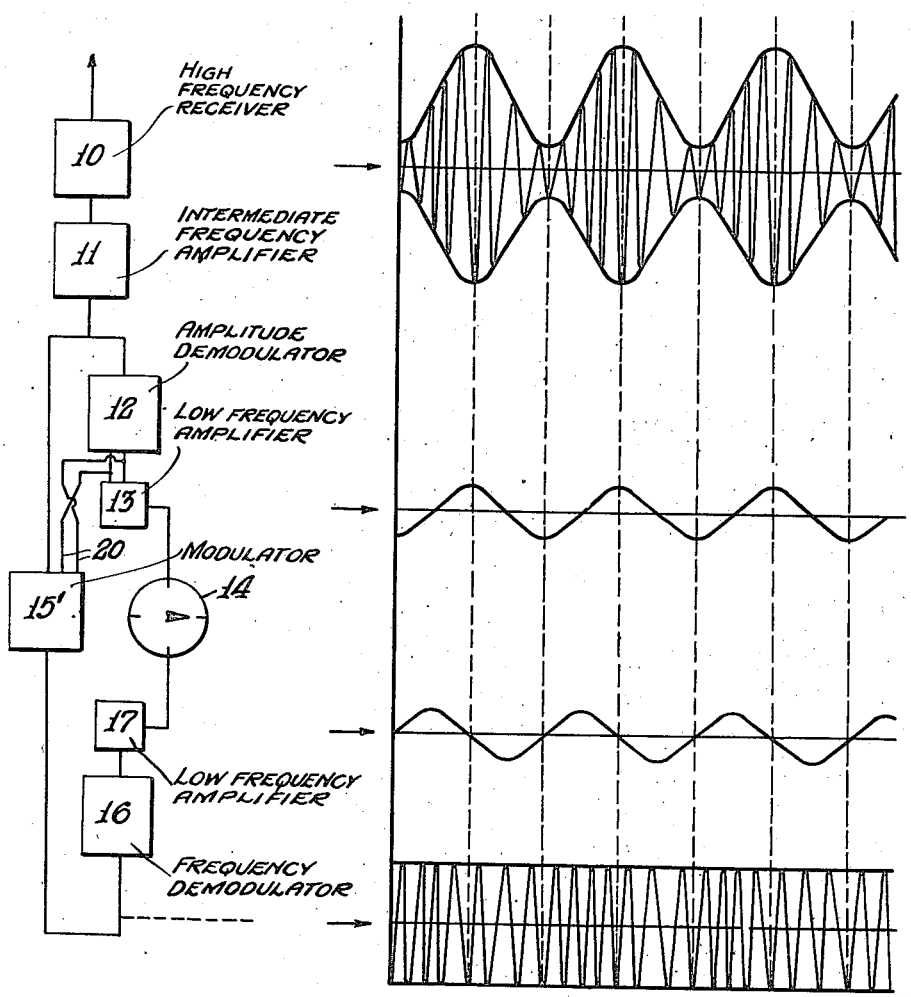

2,387,569

UNITED STATES PATENT OFFICE 2,387,569

METHOD OF DETERMINING POSITIONS IN SPACE

Hans Eggers, Berlin, Germany; vested in the Alien Property Custodian

Application November 8, 1941, Serial No. 418,348 In Germany August 29, 1940

9 Claims. (Cl. 250—11)

The present invention relates to methods of determining directions in space for aircraft navigation, and consists in certain features of novelty which will be fully understood from the following description and will be pointed out in the appended claims; reference being made to the accompanying drawings, in which:

Fig. 1A is a representation of a high frequency wave as originated by a radio range transmitter and rendered effective in a radio receiver according to this invention; Fig. 1B illustrates the different components of a radio receiver according to this invention for utilizing the high frequency wave shown in Fig. 1A; Fig. 1C shows a continually rotating directional radiation pattern produced by a radio range transmitter cooperating with the receiver; Fig. 1D shows one form of radio range transmitter; Fig. 2A represents a modified high frequency wave effective in the radio receiver, the individual components of which are shown in Fig. 2B; Fig. 2C shows a phase indicator utilizing mechanical controls; and Fig. 3A illustrates how the high frequency wave of Fig. 1A is rendered effective in a radio receiver having the components illustrated in Fig. 3B which is a modified version of the radio receiver of Fig. 1B.

The navigational direction of an airplane in space may be ascertained in a variety of different ways. According to one known method, comparison is made in an airplane receiver between a continuously rotating directional radiation pattern produced by one ground transmitter and an adequately modulated omni-directional radiation set up by a second transmitter. The cyclically incident rotating directional pattern produces in the airplane receiver a carrier wave, the modulation frequency of which corresponds to the rotational frequency of said pattern, and after this carrier wave has been rectified, an alternating current of corresponding frequency results. Now, if the omnidirectional radiation emitter which operates on a different carrier frequency be modulated with an alternating current of the same frequency as that with which the directional radiation pattern is caused to rotate, an indication with respect to the bearing of the receiver relative to the locus of transmission may be obtained after rectification of the last-named carrier wave by virtue of the mutual phase relation between the two alternating currents occurring in the outputs of the rectifier devices forming part of receiving equipment. In a preferred form according to this method, the phase of the alternating modulation current for the omni-directional or secondary transmitter will be adjusted so as to assume zero value in the instant when the null of the rotational radiation pattern passes through a given reference direction, say through a bearing pointing to the geographical north. The angular difference between the phases of the two alternating currents, which provides the true indication with respect to the direction of the receiver in space, is then ascertained by means of a low frequency phase metering device.

The practical realization of this method is somewhat complicated and requires considerable expenditure, since two transmitters must be used, that is, one for producing the rotating directional radiation pattern and one for transmitting the omni-directional signals. In consequence thereof, also the airplane must be furnished with two separate receivers, i. e. one for each kind of transmission.

It is the main object of this invention to provide a new and useful method of determining directions in space, according to which the determination of the spatial angle will be accomplished by means of a phase measurement.

The method according to the invention consists in frequency modulating the rotating directional radiation pattern, and this frequency modulation may according to a further feature of this invention be accomplished at a frequency or rhythm which is the same as, or an integral multiple of the rotational frequency of said directional radiation pattern.

The method briefly outlined above may be realized as follows. A radio transmitter, such as is shown in Fig. 1D, is caused to emit a continuously rotating directional radiation pattern having a configuration as shown in Fig. 1C of the accompanying drawings, and it will be assumed that this pattern, by way of an example, rotates at a rate of 50 cycles per second. This transmitter is now frequency modulated according to a rhythm which corresponds to the rotational frequency of said pattern, that is, with a frequency of 50 cycles per second in the example under consideration. On reception of this frequency modulated radiation and after frequency demodulation in receiving equipment, a 50 cycle frequency is obtained.

The frequency modulation of the radio transmitter will preferably be so controlled that either a maximum or a minimum frequency swing occurs when the directional radiation pattern passes through the north bearing. Assuming that the airplane in which receiving equipment is installed has obtained a direction in space which has a bearing of 90° with respect to the transmitter, a high frequency wave is rendered effective as shown in Fig. 1A. This wave is thus frequency modulated and its amplitude is given by the rotation of the directional radiation pattern in the transmitter site.

The Fig. 1B schematically shows a receiver system and its various components for utilizing the wave according to Fig. 1A. After reception in a high frequency receiver 10 and amplification in an intermediate frequency amplifier 11, if required, a separation is performed between the amplitude and the frequency modulated oscillations. The first-named amplitude modulated waves are supplied to an amplitude demodulator 12. The resulting low frequency produced in the output of this demodulator is amplified in a low frequency amplifier 13 and then applied to a phase measuring device 14. It will be observed that this low frequency exactly corresponds to the rotational frequency of the directional radiation pattern and that it has a value of 50 cycles per second in the assumption made. The frequency modulated oscillations are applied to an amplitude limiting device 15 which effects amplitude limitation of the frequency mixture. The alternating voltage from this amplitude limiting device is then demodulated in a frequency demodulator 16, and the resulting product is then amplified in a low frequency amplifier 17 and impressed upon the phase measuring device 14.

The amplitude limitation in the limiting device 15 may, for instance, be achieved by means of a suitable voltage dividing arrangement in the control grid circuit of a limiting valve forming part of this device. It is, however, likewise possible to replace the limiting device by a modulation stage, in which the received and amplified energy be oppositely modulated with the voltage obtained in the output of the amplitude demodulator in order to equalize amplitude variations of the energy received from the transmitter.

The latter arrangement is illustrated in Fig. 3B in which the modulator 15' replaces the amplitude limiting device 15 of Fig. 1B. The modulator 15' is connected to the amplitude demodulator 12 by the connections 20 which are shown as being crossed to indicate that the voltage obtained from the amplitude demodulator is connected to oppositely modulate the received and amplified energy output of the intermediate frequency amplifier 11.

As a consequence of such modulation, the modulator 15' transforms the amplified received energy which has the appearance of the wave illustrated at the top of Fig. 3A, to a substantially constant amplitude frequency modulated wave which has the appearance of the wave illustrated at the bottom of Fig. 3A. The amplitude of the latter wave is adjusted to such a value that it will not be greater than the maximum nor less than the minimum amplitude to which the frequency demodulator 16 is designed to respond. This eliminates the necessity of employing an amplitude limiter and makes certain that the amplitude of the voltages applied to the frequency demodulator 16 is of sufficient magnitude to actuate the frequency demodulator.

The frequency demodulator delivers a sine wave shaped alternating voltage of a frequency which corresponds to the rotational frequency of the directional radiation pattern. As this frequency was assumed to be 50 cycles, the frequency of the alternating voltage will be 50 cycles per second. The low frequency oscillations resulting from the frequency demodulation are, in fact, independent of direction, while the low frequency oscillations produced by the rotating directional radiation pattern are dependent on the direction from where this pattern is originated relative to the position of the receiver. These two low frequencies are, as mentioned above, impressed upon a phase measuring or indicating device 14 as shown in Figs. 1B and 3B.

This phase measuring device, as shown in Fig. 2C, may suitably consist of two synchronous motors 30 and 31 which are coupled together by an intermediary differential gear 32. These motors rotate the sun wheels 33, 33', in mutually opposing directions under the influence of the two low frequencies applied to motors 30 and 31 from the low frequency amplifiers 13 and 17, respectively. When there is a phase coincidence between the voltages delivered to these two motors and the speed of rotation of the sun wheel 33 is the same as that of motor 31, the planet wheels 34, 34' of the differential gear will remain in their zero reading positions. However, any phase difference between these voltages will move the planet wheels from the zero reading position, and this angular displacement of the planet wheels about the axis of the differential gear amounts to 180° when the phase displacement between the two voltages is equal to 360°. The angular position of the planet wheels gives a measure for the phasal relation between the two alternating currents.

It is, however, not necessary that the frequency modulation be effected in accordance with a rhythm which is the same as the rotational frequency of the directional radiation pattern. This rhythm may conveniently be so chosen that the rate of frequency modulation of the transmitter is an integral multiple of the rotational speed of the said pattern. The low frequency occurring in the output of the frequency demodulator of the receiver is then two or three times as high as the low frequency set up in the output circuit of the amplitude demodulator due to the reception of the rotating directional radiation. The single additional facility required in this case is a stepping up the low frequency from the amplitude demodulator at a rate which corresponds to the integral multiple selected for the frequency modulation of the transmitter relative to the rotational frequency of the directional radiation pattern. Such stepping up or transformation may be accomplished either mechanically or electrically, as desired. If a mechanical transformation is deemed more suitable, the two low frequency alternating currents may be impressed upon the phase metering device, shown in Fig. 2C, in a manner described in the foregoing, but in this case one of the synchronous motors, 30, is connected to the differential gear through gear coupling 35 having a transformation or gearing ratio of 1:2 or 1:3 for mechanically stepping up the lower frequency to the higher frequency to which the other motor responds. An electric transformation may be achieved, for example, by correspondingly multiplying the low frequency which is obtained in the receiver on account of the rotating directional radiation pattern. A duplication of the low frequency is conveniently attained in a simple manner by rectification in a full-wave rectifier, whereby the resulting pulsating continuous voltage is used for exciting an oscillatory circuit which is tuned to twice the frequency as applied to the rectifier.

An arrangement as above mentioned is exemplified in Fig. 2B, while Fig. 2A represents a high frequency wave occurring in the input stage of the receiving system according to Fig. 2B when the radio transmitter is frequency modulated at a rate which is twice the rotational frequency of the directional radiation pattern. The low frequency set up in the output of the amplitude demodulator due to the rotating radiation pattern is applied to a full-wave rectifier 18 and the rectified direct voltage is used for exciting an oscillatory circuit 19 which is tuned to a frequency which is twice as high as the rotational frequency of the directional radiation pattern.

The amplitude limiter 15 shown in Fig. 2B may be replaced by the modulator 15' in the manner disclosed in Fig. 3B to produce exactly the same result of eliminating the amplitude variations in the received frequency modulated wave.

The examples heretofore described have been based upon the assumption that the radio transmitter is frequency modulated and that the frequency modulated radio frequency is used for producing the directional radiation pattern. It is now proposed according to a further feature of this invention to provide two final stages in the radio transmitter, one of which is frequency modulated and adapted to feed the center radiator of the directional antenna system, while the other final stage, which is not frequency modulated, feeds the remaining components of the antenna system which produce the rotating directional radiation pattern. Such an arrangement involves the beneficial advantage, that the frequency modulation may be received without amplitude modulation.

The primary advantage obtained in a system operating in accordance with the method set forth in the foregoing resides in the fact it functions with the same superiority in the entire frequency spectrum, that is, whether it will be employed in long wave, short wave or ultra-short wave operation. Since only one single carrier is present and due to the fact that this carrier is frequency modulated and amplitude modulated, any fading will be ineffective with respect to the phase condition in the receiving position. It is, moreover, possible to completely modulate the radio transmitter because of the fact that an additional amplitude modulation of the radio frequency carrier, which has heretofore formed part of the operation of prior art systems adapted for the same purpose, is neither accomplished nor required.

What is claimed is:

1. The method of determining directions in space, which comprises producing a continually rotating directional wave radiation pattern, frequency modulating the wave produced in this pattern at a given rate with respect to the rotational speed of the directional radiation pattern, receiving the wave produced in said pattern, detecting the wave received from said rotational radiation pattern and the frequency modulated radiation thereof, subjecting the oscillations produced in response to the reception of the rotating radiation pattern to an amplitude demodulation, subjecting the frequency modulated oscillations to modulation by the alternating current resulting from the amplitude demodulation and in such phase as to equalize the amplitude variations thereof, subjecting the frequency modulated oscillations to a frequency demodulation, and comparing the phase relation between the alternating currents resulting from the amplitude demodulation and the frequency demodulation for ascertaining the direction of the radio receiver relative to the radio transmitter.

2. The method as set forth in claim 1, wherein the frequency of the produced wave is modulated at a rate which corresponds to the number of revolutions per second with which the directional radiation pattern rotates.

3. The method as set forth in claim 1, wherein the frequency of the produced wave is modulated at a rate which is an integral multiple of the number of revolutions per second with which the directional radiation pattern rotates.

4. A radio frequency receiver for receiving the radio wave of a rotating directional wave radiation pattern in which said wave is frequency modulated, said receiver including a high frequency input stage responsive to amplitude modulated and frequency modulated radio frequency oscillations, means for separating amplitude modulated oscillations from frequency modulated oscillations, means for demodulating amplitude modulated oscillations, means for modulating said frequency modulated oscilations with the output of said amplitude demodulating means in such phase as to equalize the amplitude variations in said frequency modulated oscillations, means for demodulating frequency modulated oscillations, and means for comparing the phase relation between an alternating current derived from said amplitude demodulating means and an alternating current derived from said frequency demodulating means for ascertaining the direction of said radio frequency receiver with respect to said frequency modulated rotating directional radiation pattern.

5. A radio frequency receiver cooperating with a radio frequency transmitter producing a continuously rotating directional radiation pattern and frequency modulated at a rate which is an integral multiple of the number of revolutions with which the directional radiation pattern rotates, comprising a high frequency input stage responsive to amplitude modulated and frequency modulated radio frequency oscillations, means for demodulating amplitude modulated oscillations, means for modulating said frequency modulated oscillations with the output of said amplitude demodulating means in such phase as to equalize the amplitude variations in said frequency modulated oscillations, means for demodulating frequency modulated oscillations, means for stepping up the frequency of an alternating current produced in said amplitude demodulating means to the frequency of an alternating current resulting from said frequency demodulating means, and means for comparing the phase relation between said currents for ascertaining the direction in space of said radio frequency receiver relative to said radio frequency transmitter.

6. A radio frequency receiver as set forth in claim 5, wherein said means for stepping up the frequency of an alternating current produced in said amplitude demodulating means comprise a full-wave rectifier followed by an oscillatory circuit tuned to a frequency which is an integral multiple of the frequency occurring at the output of said amplitude modulating means.

7. A radio frequency receiver cooperating with a radio frequency transmitter producing a continuously rotating directional radiation pattern and frequency modulated at a rate which is an integral multiple of the number of revolutions with which the directional radiation pattern rotates, comprising a high frequency input stage responsive to amplitude modulated and frequency modulated radio frequency oscillations, means for demodulating amplitude modulated oscillations, means for modulating said frequency modulated oscillations with the output of said amplitude demodulating means in such phase as to equalize the amplitude variations in said frequency modulated oscillations, means for demodulating frequency modulated oscillations, and a phase measuring device for comparing the phase relation between an alternating current produced in said frequency demodulating means and an alternating current resulting from said amplitude demodulating means, means being provided in said phase measuring device for mechanically stepping up the effect of the frequency of the last-named alternating current to that of the first-named alterating current.

8. A radio frequency receiver as set forth in claim 7, wherein said phase measuring device comprises a differential gear having one sun wheel directly connected to a synchronous motor fed by an alternating current produced in said frequency demodulating means and another sun wheel connected to a second synchronous motor through a stepping up device having a transformation ratio equal to the integral multiple of frequency modulation relative to the rotational speed of said directional radiation pattern in said radio frequency transmitter, said second synchronous motor being fed by an alternating current obtained from said amplitude demodulating means.

9. A radio frequency receiver as set forth in claim 7, wherein said phase measuring device includes means for furnishing direct readings concerning the direction of said receiver relative to said radio frequency transmitter.

HANS EGGERS.